(12) United States Patent  
Sennett et al.

(10) Patent No.: US 8,649,758 B2  
(45) Date of Patent: *Feb. 11, 2014

(54) EMERGENCY ALERT SYSTEM INSTRUCTIONAL MEDIA

(71) Applicant: AT&T Mobility II LLC, Atlanta, GA (US)

(72) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,403

(22) Filed: May 30, 2013

(65) Prior Publication Data

US 2013/0260709 A1    Oct. 3, 2013

Related U.S. Application Data

(63) Continuation of application No. 12/059,050, filed on Mar. 31, 2008, now Pat. No. 8,489,060.

(51) Int. Cl.
*H04M 11/04* (2006.01)

(52) U.S. Cl.
USPC ........ 455/404.1; 455/521; 340/438; 340/531; 340/539.28; 340/573.1

(58) Field of Classification Search
USPC ............ 455/404.1, 404.2, 521; 340/438, 539, 340/0.28, 573.1, 531, 439
See application file for complete search history.

(56) References Cited

U.S. PATENT DOCUMENTS

| | | | |
|---|---|---|---|
| 5,740,532 A | 4/1998 | Fernandez et al. | |
| 6,112,075 A | 8/2000 | Weiser | |
| 2006/0040639 A1 | 2/2006 | Karl et al. | |
| 2007/0149167 A1 | 6/2007 | Lee | |
| 2007/0280428 A1 | 12/2007 | McClelland | |
| 2008/0174484 A1 | 7/2008 | Katz | |
| 2009/0015428 A1 | 1/2009 | Lemmon | |

*Primary Examiner* — Patrick Edouard  
*Assistant Examiner* — Julio Perez  
(74) *Attorney, Agent, or Firm* — Woodcock Washburn LLP

(57) ABSTRACT

Emergency instructional messages are utilized to provide instructions to a user in the event of an emergency. The instructional message may be various media, including, but not limited to, text, images, video, audio, and/or multimedia. The instructional message can be prerecorded and stored in a mobile device and/or on a communications network. Instructional message may be provided manually by an alert initiator and/or automatically based upon a type of alert. The instructional message may be initiated based upon the initiation of an emergency alert system (EAS) transmission, the occurrence of an event, a designated person, or a security violation, for example. Further, the instructional message may be tailored depending upon a location, such as the expected or determined location of the intended recipient or communication device of the instructional message.

20 Claims, 6 Drawing Sheets

EMERGENCY ALERT SYSTEM INSTRUCTIONAL MEDIA

CROSS REFERENCE TO RELATED APPLICATIONS

This application is a continuation of, and claims priority to, U.S. patent application Ser. No. 12/059,050, filed Mar. 31, 2008, entitled "Emergency Alert System Instructional Media," the entire contents of which are hereby incorporated herein by reference.

TECHNICAL FIELD

The technical field generally relates to communications systems, and more specifically, to emergency alert services implemented through a communications system.

BACKGROUND

The wireless Emergency Alert System (EAS) is capable of providing messages indicative of a variety of types of alerts. Via the EAS, subscribers thereof can receive messages pertaining to weather conditions, disasters, AMBER (America's Missing: Broadcast Emergency Response) alerts, and/or alerts issued by the Government, for example. The alert typically consists of a message that an emergency situation has or is occurring. It is not uncommon for a person receiving the alert to not know what to do in case of an emergency. For example, a user receiving an EAS may not know what action to take in view of the emergency. As another example, a child may not know what action to take in case of an emergency, such as a fire.

SUMMARY

Emergency instructional messages are utilized to provide instructions to a user in the event of an emergency. The instructional message may be various media, including, but not limited to, text, images, video, audio, and/or multimedia. The instructional message can be prerecorded and stored in a mobile device and/or on a communications network. Instructional message may be provided manually by an alert initiator and/or automatically based upon a type of alert. The instructional message may be initiated based upon the initiation of an EAS, the occurrence of an event, a designated person, or a security violation, for example. Further, the instructional message may be tailored depending upon a location, such as the expected or determined location of the intended recipient or communication device of the instructional message.

BRIEF DESCRIPTION OF THE DRAWINGS

The foregoing and other objects, aspects and advantages of emergency instructional media will be better understood from the following detailed description with reference to the drawings.

DETAILED DESCRIPTION OF ILLUSTRATIVE EMBODIMENTS

Upon receiving notification of an existing and/or pending emergency, from an emergency alert initiator, such as a member of law enforcement, local government, or an agency (e.g., National Weather Service), or the like, an emergency instructional message is provided to a mobile device. In an example embodiment of the herein described methods and systems for providing emergency instructional message, an emergency instructional message is provided to mobile devices in lieu of or in addition to the emergency alert message generated by the emergency alert initiator.

In another example, the emergency instructional message may be a message prerecorded by a parent or guardian intended for their child in the event of a specific emergency. In this example, an emergency alert message may be transmitted notifying the recipients of an emergency situation. Instead of receiving instructions from a stranger, and to possibly quell fears, the recipient may receive an instructional video from the parent. In the event of an emergency, the child can view and/or listen to the emergency instructional message and act accordingly.

In an example embodiment, the emergency instructional message may be pre-loaded into a mobile device or received as part of a transmitted message. In another example embodiment, the message may be based upon a determined location for the mobile device. For example, if the emergency alert message was transmitted to notify recipients of a tornado, the emergency instructional message may indicate one set of instructions at a first determined location and a different set of instructions at a second determined location.

Figure 1:
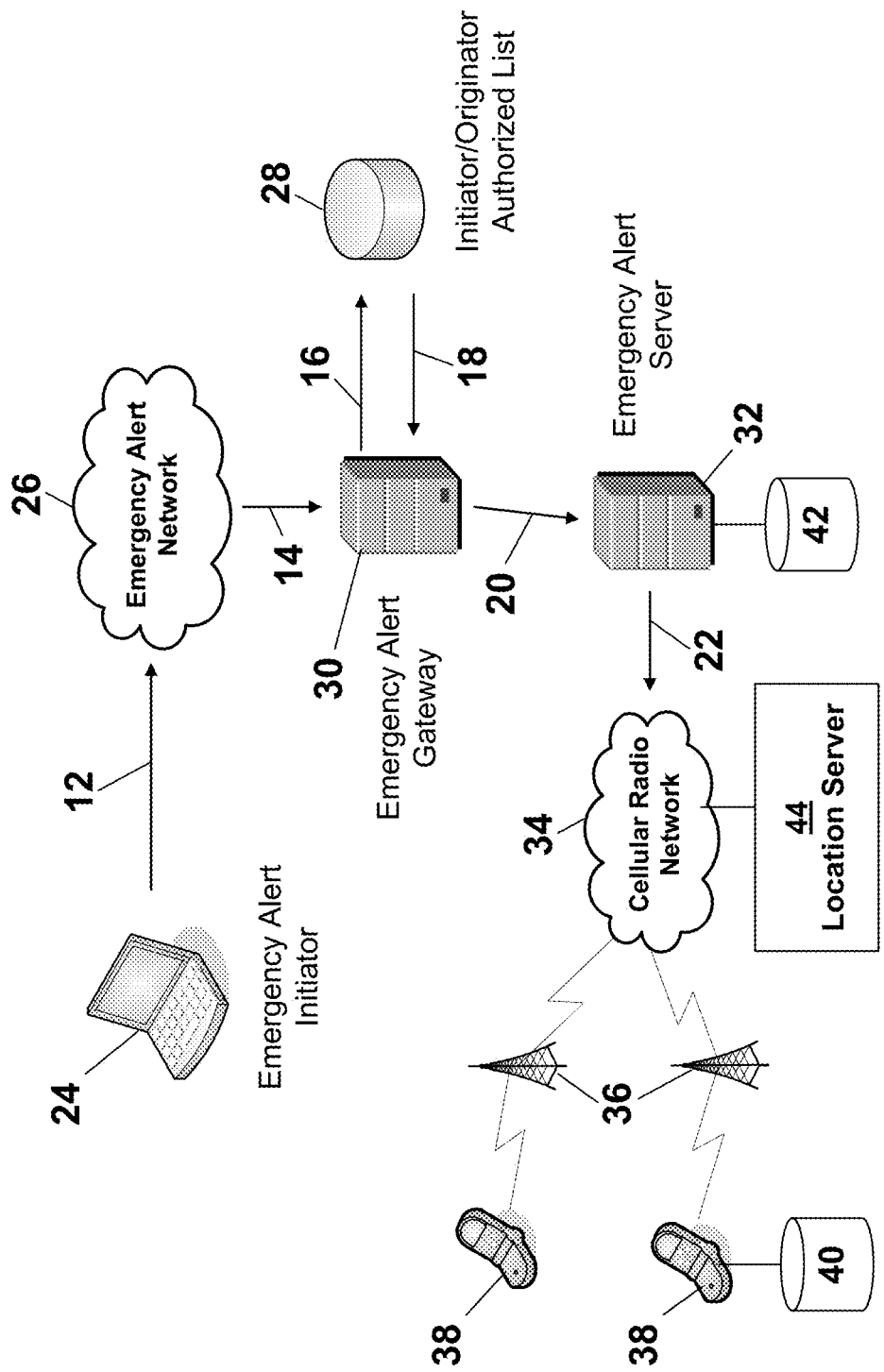
FIG. 1 is a flow diagram of an example process and system for providing an emergency instructional message.

FIG. 1 is a flow diagram of an example process and system for providing an emergency instructional message. At step 12, an emergency alert message is provided to the emergency alert network 26 by an emergency alert initiator 24. In an example embodiment, the emergency alert network 26 is a network configured to accommodate Emergency Alert System (EAS) messages. The emergency alert initiator 24 can be any appropriate emergency alert initiator. For example, an emergency alert initiator 24 can be a government official, a member of a police department, an organization such as the National Weather Service, or the like. Thus the emergency alert initiator 24 could be any of thousands of emergency alert initiators located throughout the United States and Canada.

When the emergency alert initiator 24 receives notification of an existing or pending emergency, the emergency alert initiator 24 generates an emergency alert message formatted in conformance with a protocol for transmission to the emergency alert network 26. The transmission of the emergency alert message, at step 12, can be via a wired interface, a wireless interface, or a combination thereof. The protocol can comprise any appropriate protocol. In an example embodiment, the emergency alert message provided at step 12 is formatted in accordance with the common alerting protocol (CAP). The common alerting protocol is a general format for exchanging all-hazard emergency alerts and public warnings over various wireless networks. A CAP alert message (an alert message formatted in accordance with the common alerting protocol), comprises segments, or fields, indicative of various characteristics of emergency event. For example, the CAP comprises fields indicative of the sender of the emergency alert message, the type of event, the expiration of the event, the urgency of the event, the severity of the event, the certainty of the event, and the intended audience of the event.

At step 14, the emergency alert message is provided to a wireless emergency alert gateway 30. The transmission of the emergency alert message, at step 14, can be via a wired interface, a wireless interface, or a combination thereof. The emergency alert gateway 30 can comprise any appropriate processor, server, or the like. In the embodiment of FIG. 1, upon receipt of the emergency alert message (at step 14), the emergency alert gateway 30 analyzes the received emergency alert message to generate, or select, a predetermined emergency alert message and to determine if the initiator/originator of the emergency alert message is an authorized emergency alert initiator/originator. It should be noted that, although the system and method of FIG. 1 discusses the determination of the authorization of the emergency alert initiator/originator, the present subject matter is not limited in scope to that implementation.

In an example embodiment, at step 16, the emergency alert gateway 30 accesses a database 28 to determine if the initiator/originator is authorized. The database 28 can comprise any appropriate storage. In an example embodiment the database 28 comprises a list of authorized initiators/originators. At step 18, an indication is provided to the emergency alert gateway 30 as to whether the initiator/originator is authorized. If the initiator/originator is an authorized initiator/originator, a predetermined emergency alert message comprising optional free-form text or characters, is provided to the emergency alert server 32 at step 20. Thus, if the initiator/originator is an authorized initiator/originator and free-form text or characters accompany the emergency alert message provided at step 14, the free-form text or characters are provided as the predetermined emergency alert message at step 20. If the initiator/originator is an authorized initiator/originator, and no free-form text or characters accompany the emergency alert message provided at step 14, the selected or generated default predetermined emergency alert message is provided at step 20. If, at step 18, an indication is provided to the emergency alert gateway 30 that the initiator/originator is not an authorized initiator/originator, the selected or generated predetermined emergency alert message is provided at step 20.

Thus, if it is determined that the initiator/originator of the emergency alert message is not authorized to deviate from the format of the predetermined emergency alert message, the predetermined emergency alert message is provided at step 20. If it is determined that the initiator/originator of the emergency alert message is authorized to deviate from the format of the predetermined emergency alert message, the predetermined emergency alert message, formatted in accordance with the authorized initiator/originator format, is provided at step 20.

The emergency alert server 32, upon receiving a predetermined emergency alert message, determines the appropriate mobile devices 38 to receive the predetermined emergency alert message. At step 22, the emergency alert server 32 provides the emergency alert message to the appropriate mobile devices 38 via a cellular radio network 34 and transmitters 36.

In an example embodiment, it may be beneficial to provide an emergency instructional message along with the emergency alert message. In an embodiment, the emergency instructional message may be video, text, images, audio, and/or multimedia. For example, the emergency instructional message may be a video illustrating the desired actions to be taken during an emergency. In another example, the emergency instructional message may be a text message with instructions. In another example, the emergency instructional message may be a map overlaid with directional markers indicating geographic directions for the recipient to follow.

A system, such as the system disclosed in FIG. 1, may be configured to initiate an emergency instructional message on a mobile device upon receipt of an emergency alert message or manual initiation. In an example wherein the emergency instructional message is initiated upon receipt of an emergency alert message, an emergency instructional message may be associated with a particular emergency. For example, the emergency instructional message may be associated with attributes of the emergency alert message. For example, if the emergency alert message was transmitted to notify recipients of a tornado, the emergency instructional message may provide instructions to the recipient of the media on what to do or where to go. The emergency instructional message may be a prerecorded video with information on shelters in the area, directions to the shelters, or evacuation routes to be taken. In another example, in the event of an emergency alert message indicating an earthquake warning, the message may be a multimedia message having audio and video instructing the recipient on the drop and cover technique.

In an embodiment in which a manual initiation may be implemented, a child may be prompted, vis-à-vis a phone conversation with a parent, to play a specific emergency instructional media. For example, a parent may see a tornado warning issued for an area that includes a school attended by their child. The parent may send a message to their child to view a tornado warning message stored on the child's mobile device.

The emergency instructional message may be generated and stored in one or more storage units in a system, such as memory 40 of mobile device 38 and memory 42 associated with emergency alert server 32. Depending upon the capability or configuration of a system providing emergency instructional message, the emergency instructional message may be accessed from memory 42 and transmitted to mobile devices 38, or may be accessed from memory 40 and initiated on mobile devices 38.

In an embodiment in which the emergency instructional message is stored on the mobile devices, the messages may be sent to memory 40 of mobile devices 38 (only one memory 40 is shown) using various means, including remote transmission via cellular radio network 34 and a transfer from a personal computer to mobile devices 38 through the use of a communication connection, such as a universal serial bus (USB) connection. In another example, the emergency instructional message may be programmed directly into mobile device 38 and stored in memory 40. For example, a text message comprising emergency directions may be typed and stored in memory 40 of mobile device 38 using a keypad (not shown) of mobile device 38.

The emergency instructional message may also be associated with a particular location, such as the location of an intended recipient of the emergency instructional message. An emergency instructional message may be tailored based upon the location of the recipient of the message. In FIG. 1, location server 44 may be implemented to determine the location of mobile devices 38. Upon generation of an emergency instructional message, the message may be associated with a location. In other words, the emergency instructional message may or may not initiate depending upon a location, or, the contents of the emergency instructional message may vary depending upon a location. For example, an emergency alert message may be transmitted for a tornado warning. The system of FIG. 1 may determine the location of mobile devices 38 to determine the emergency instructional message to initiate using location server 44. Based upon a determination of a location, the emergency instructional message that is initiated may be a map indicating an escape route from the determined location to a safe location.

The mobile devices 38 are representative of any appropriate type of device that can receive emergency instructional messages. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a Walkman, etc., (b) a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

Figure 2:
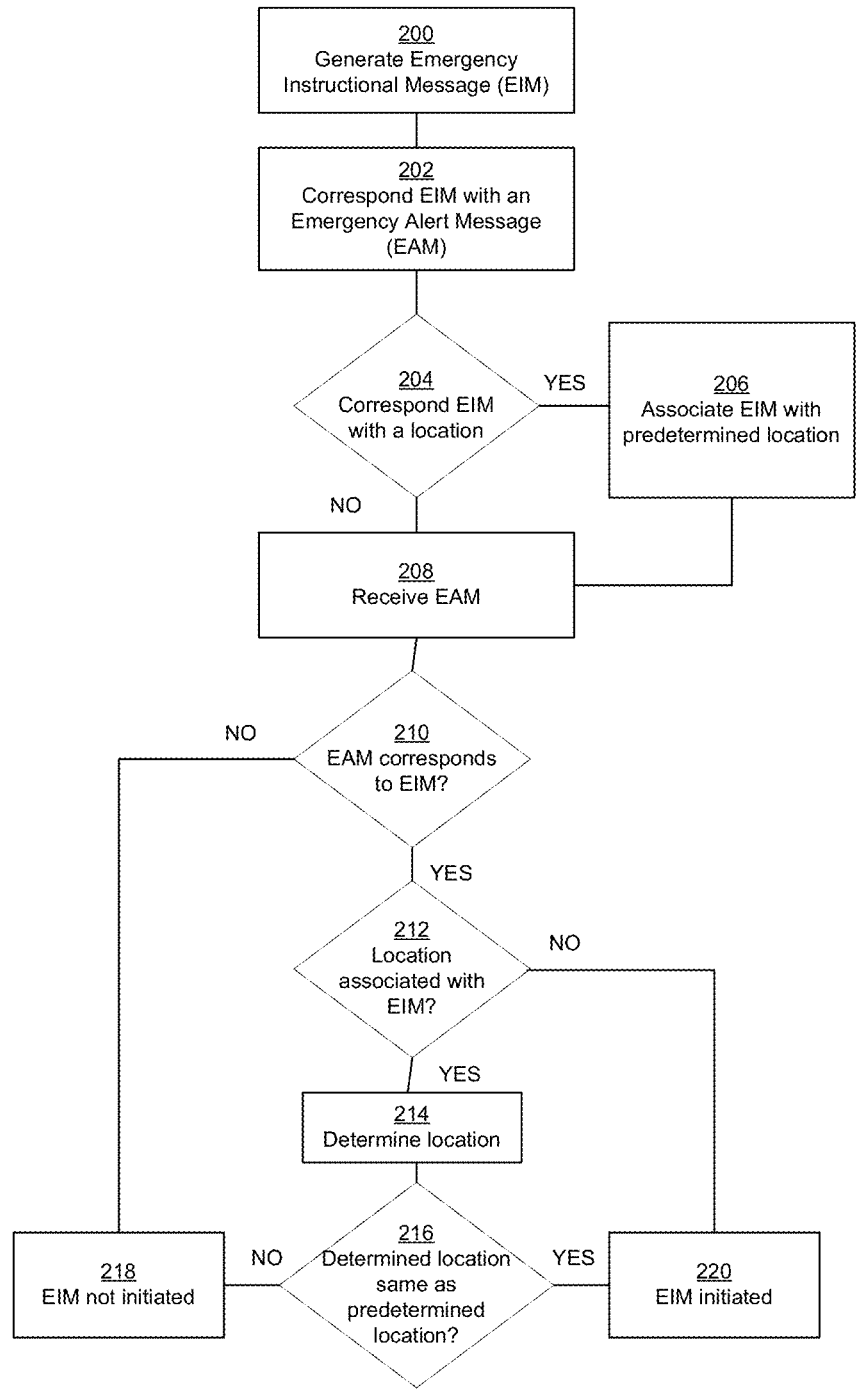
FIG. 2 is a flow diagram of an example process for providing an emergency instructional message.

FIG. 2 is an exemplary method for providing emergency instructional messages. An emergency instructional message (EIM) is generated 200. The EIM is corresponded with 202, or associated with, an emergency alert message (EAM). For example, as discussed above, an EIM may provide instructions on what to do during a particular emergency, such as a tornado or an earthquake. If a location 204 is to be used to determine if an EIM is to be initiated, the EIM is associated with a predetermined location 206. For example, the EIM may be an escape route overlaid on a map showing a beginning and ending location.

Once an EAM is received 208, a determination is made 210 as to whether or not the EIM corresponds to the EAM received. If the EAM does not correspond to the EIM, then the EIM is not initiated 218. For example, the EIM may be an instructional audio message for a tornado, but the EAM may be for an earthquake. If the EAM does correspond to the EIM 210, a determination 212 is made as to whether or not a location is associated with the EIM. This determination may be optional, i.e. if it is determined 210 that the EAM corresponds to the EIM, the EIM may be initiated 220. If a determination 212 as to location is to be determined, the location is determined 214. The location may vary, but may be a location of a mobile device, such as mobile devices 38 of FIG. 1. If the determined location is the same 216 as the predetermined location associated with the EIM 206, the EIM is initiated 220. If the determined location is not the same 216 as the predetermined location associated with the EIM 206, the EIM is not initiated 218.

Figure 3:
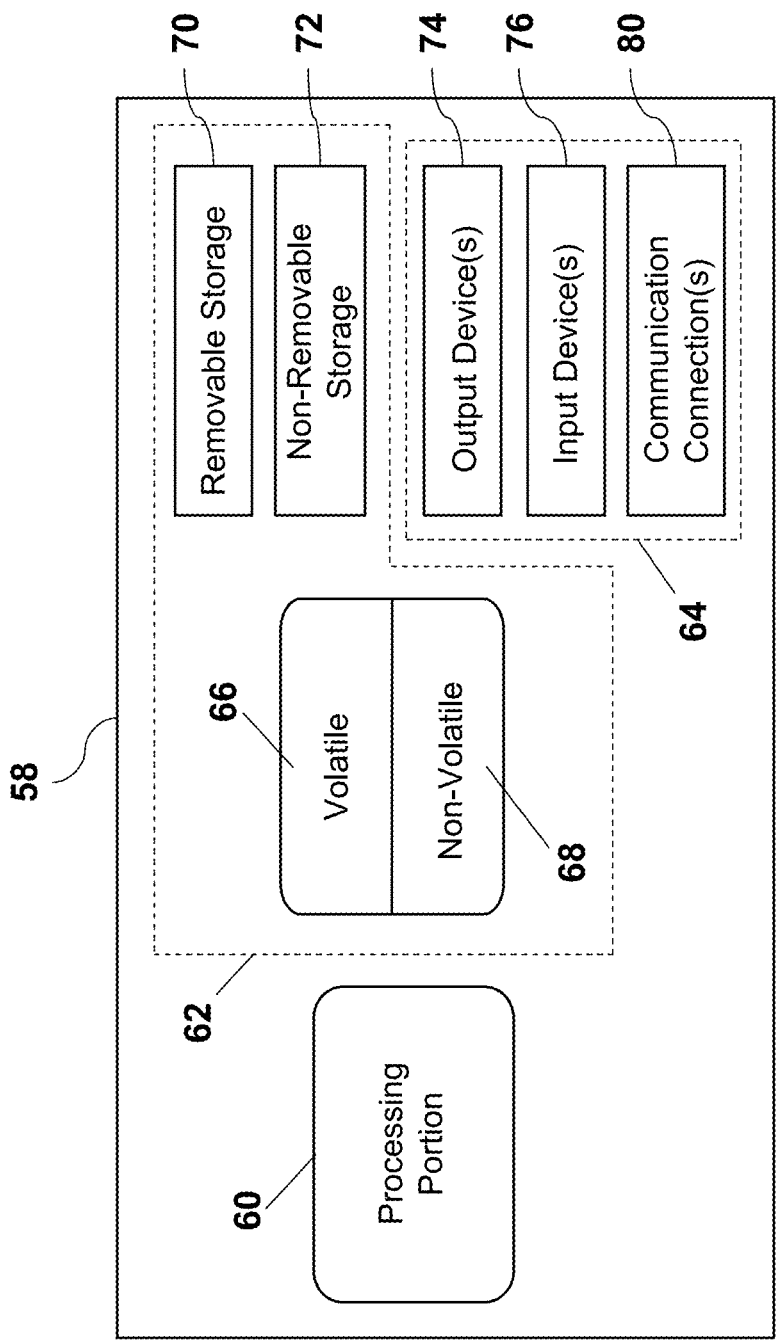
FIG. 3 is a block diagram of an example processor for providing an emergency instructional message.

FIG. 3 is a block diagram of an example processor 58 for providing an emergency instructional message. In an example configuration, the processor 58 comprises the emergency alert gateway 30, the emergency alert server 32, the database 28, or a combination thereof. It is emphasized that the block diagram depicted in FIG. 3 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 3) to allow communications therebetween. The input/output portion 64 is capable of providing and/or receiving components utilized to generate/select and distribute an emergency instructional message as described above. For example, as described above, the input/output portion 64 is capable of providing/receiving an emergency alert message and an emergency instructional message. The processing portion 60 is capable of associating the emergency instructional message with an emergency alert message, determining if the emergency instructional message is to be initiated, and to initiate the emergency instructional message, or a combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with providing an emergency instructional message. For example, as described above, the memory portion is capable of storing an emergency instructional message. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain communications connection(s) 80 that allow the processor 58 to communicate with other devices, for example. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 58 also can have input device(s) 76 such as keyboard, mouse, pen, voice input device, touch input device, etc. Output device(s) 74 such as a display, speakers, printer, etc. also can be included.

The following description sets forth some exemplary telephony radio networks and non-limiting operating environments in which an emergency instructional message may be provided. The below-described operating environments should be considered non-exhaustive, however, and thus the below-described network architectures merely show how an emergency instructional message can be incorporated into existing network structures and architectures. It can be appreciated, however, that an emergency instructional message can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of the present subject matter can be applied independently of the method for data transport, and do not depend on any particular network architecture, or underlying protocols.

Figure 4:
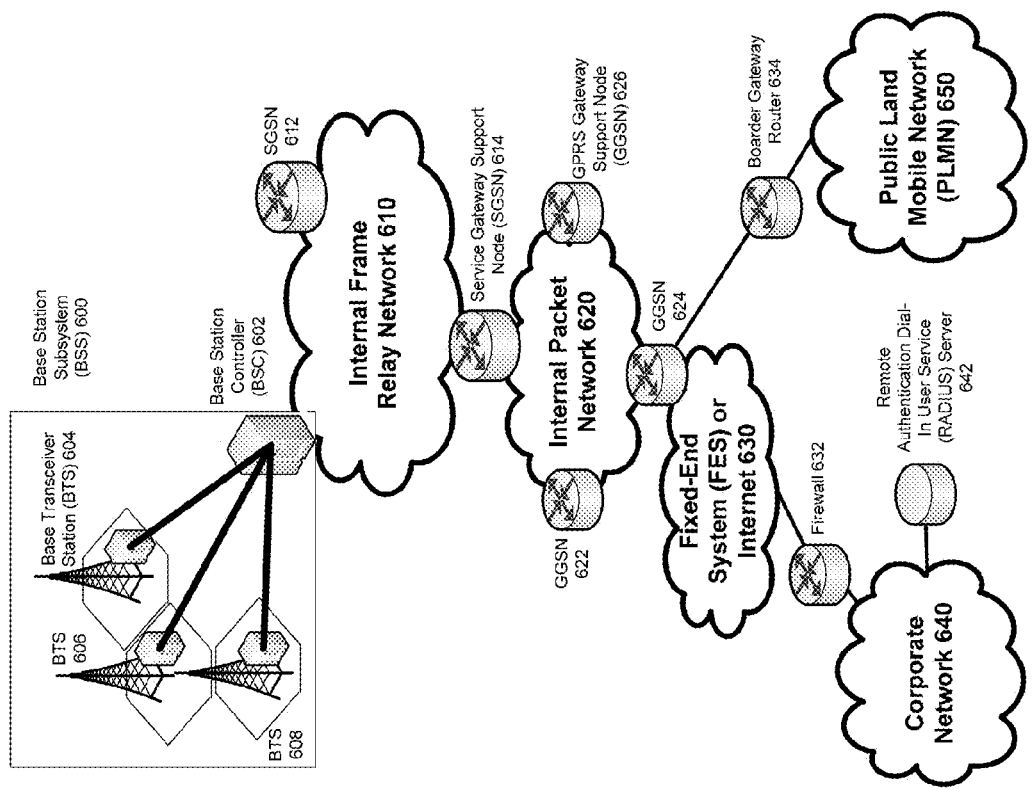
FIG. 4 depicts an overall block diagram of an exemplary packet-based mobile cellular network environment, such as a GPRS network, in which providing emergency instructional message may be practiced.

FIG. 4 depicts an overall block diagram of an exemplary packet-based mobile cellular network environment, such as a GPRS network, in which an emergency instructional message may be provided. In an example configuration, the cellular radio network 34 and towers 36 are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
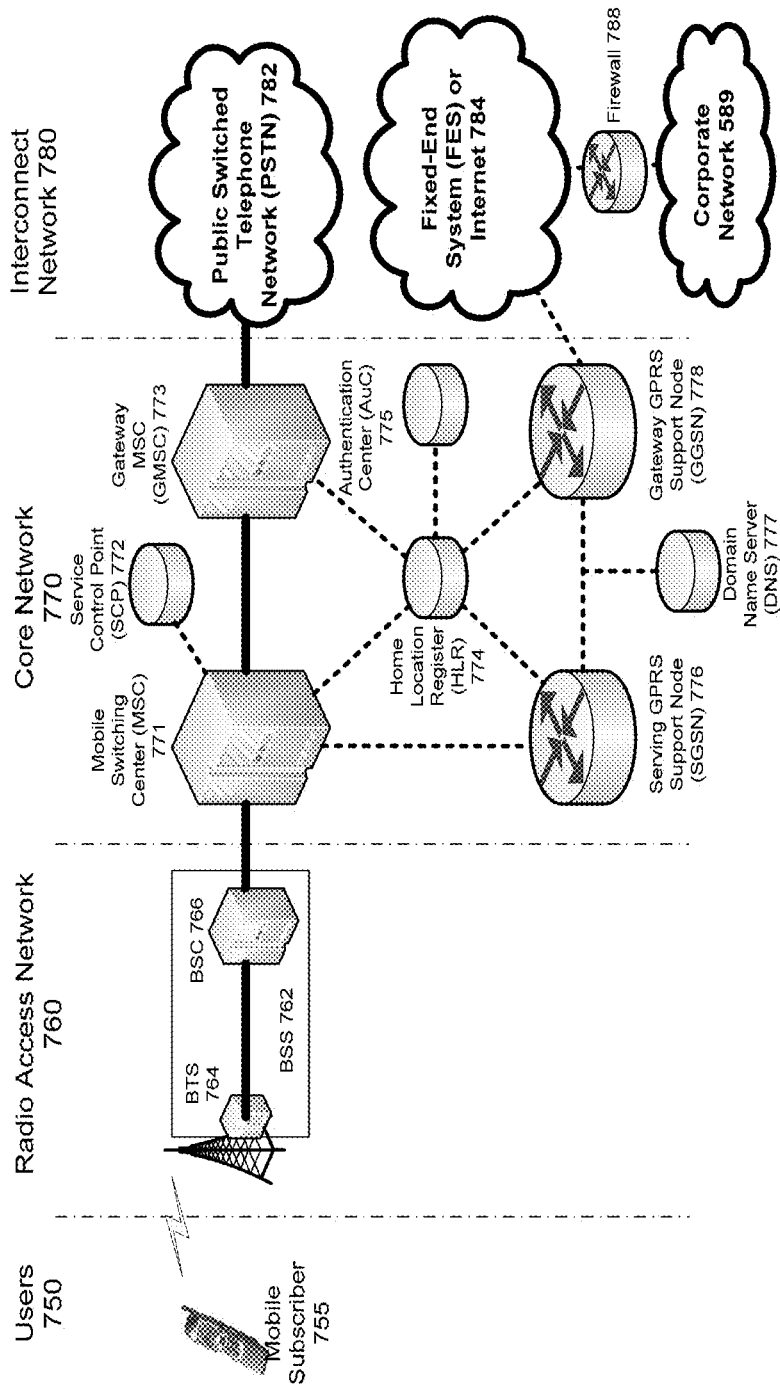
FIG. 5 illustrates an architecture of a typical GPRS network as segmented into four groups.

FIG. 5 illustrates an architecture of a typical GPRS network as segmented into four groups: users 750, radio access network 760, core network 770, and interconnect network 780. In an example configuration the emergency alert network 110, and the wireless broadcast network 116 are encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises mobile device 12. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of predetermined emergency alert messages can include but are not limited to Gateway GPRS Support Node tables, Fixed End System router tables, firewall systems, VPN tunnels, and any number of other network elements as required by the particular digital network.

Figure 6:
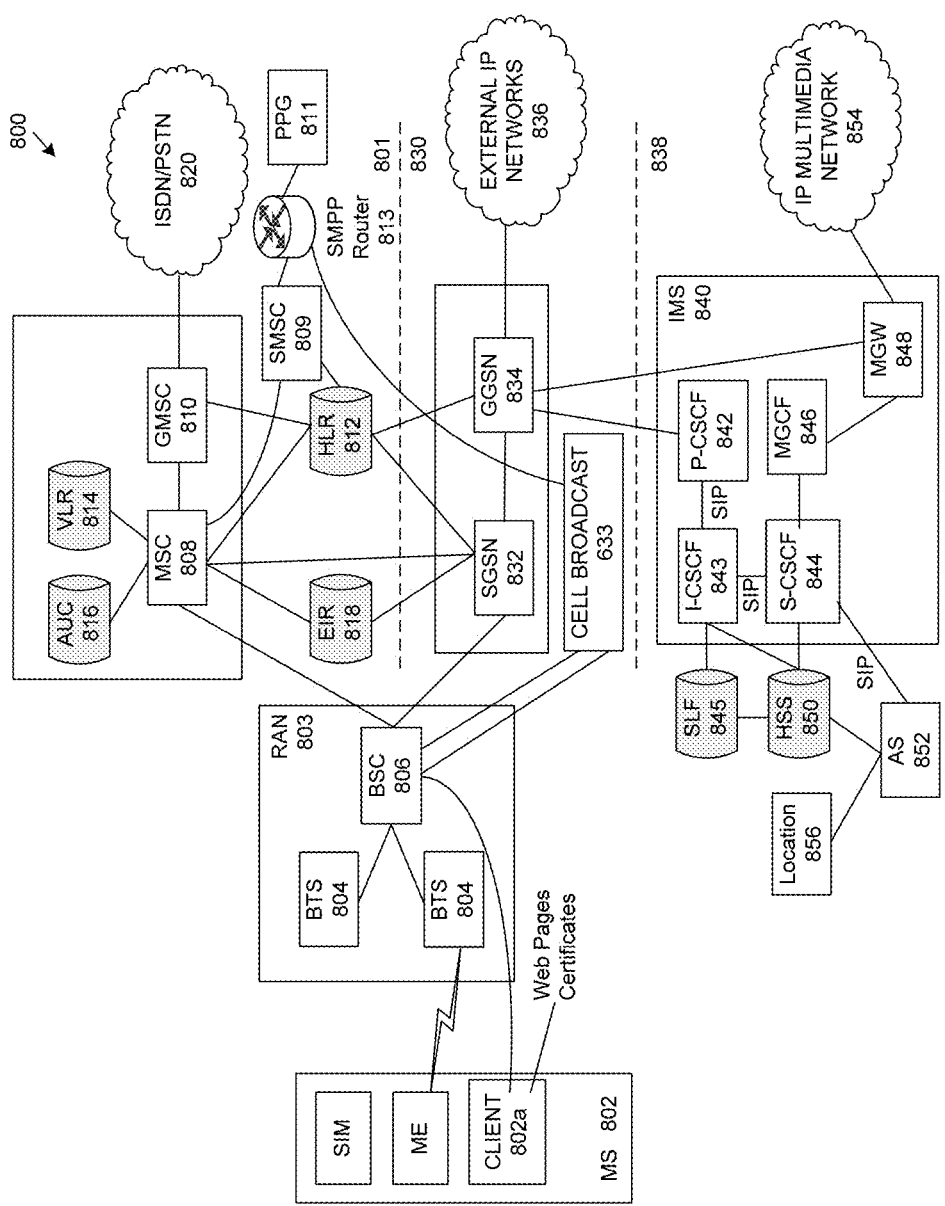
FIG. 6 illustrates an example alternate block diagram of an exemplary GSM/GPRS/IP multimedia network architecture in which an emergency instructional message may be incorporated.

FIG. 6 illustrates another exemplary block diagram view of a GSM/GPRS/IP multimedia network architecture 800 in which an emergency instructional message can be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of an emergency instructional message have been described in connection with various computing devices, the underlying concepts can be applied to any computing device or system capable of implementing the present subject matter. The various techniques described herein can be implemented in connection with hardware or software or, where appropriate, with a combination of both. Thus, implementing an emergency instructional message can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing an emergency instructional message. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for an emergency instructional message also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing an emergency instructional message. When implemented on a general-purpose processor, the program code combines with the processor to provide a unique apparatus that operates to invoke the functionality of the present subject matter. Additionally, any storage techniques used in connection with an emergency instructional message can invariably be a combination of hardware and software.

While an emergency instructional message has been described in connection with the various embodiments of the various figures, it is to be understood that other similar embodiments can be used or modifications and additions can be made to the described embodiment for performing the same function of an emergency instructional message without deviating therefrom. For example, one skilled in the art will recognize that a system for implementing an emergency instructional message as described may apply to any environment, whether wired or wireless, and may be applied to any number of devices connected via a communications network and interacting across the network. Therefore, emergency instructional messages should not be limited to any single embodiment, but rather should be construed in breadth and scope in accordance with the appended claims.

What is claimed:

1. A method comprising:
 receiving emergency instructional content indicative of being generated and provided by a first user of a wireless network, the emergency instructional content comprising a first emergency attribute,
  wherein the first user of the wireless network is associated with a second user of the wireless network,
  wherein the second user of the wireless network is an operator of a first communications device, and
  wherein the emergency instructional content is intended for presentation on the first communications device;
 receiving an emergency alert message from an emergency services agency, wherein the emergency alert message comprises a second emergency attribute that corresponds to the first emergency attribute;
 determining that a location of the first communications device corresponds to the emergency instructional content;
 responsive to receiving the emergency alert message comprising the second emergency attribute that corresponds to the first emergency attribute and to determining that the location of the first communications device corresponds to the emergency instructional content, generating an emergency instructional message comprising the emergency instructional content and the emergency alert message;
 storing the emergency instructional message on at least one of a mobile device or a server configured to interface with a cellular network, wherein the cellular network is configured to transmit the emergency instructional message to the first communications device; and
 transmitting the emergency instructional message to the first communications device.

2. The method of claim 1, wherein the emergency instructional content comprises at least one of a text message, an image, a video, an audio message, a multimedia message, or a combination thereof.

3. The method of claim 1, wherein the first user is at least one of a parent or a guardian of the second user.

4. The method of claim 1, wherein the emergency instructional content comprises first content associated with the location and second content associated with a second location.

5. The method of claim 4, wherein generating the emergency instructional message comprising the emergency instructional content and the emergency alert message comprises selecting the first content associated with the location based on determining that the location of the first communications device corresponds to the emergency instructional content.

6. The method of claim 1, wherein the emergency services agency comprises an Emergency Alert System.

7. The method of claim 1, wherein receiving the emergency instructional content comprises receiving an indication of the location.

8. A system comprising:
 an input/output portion configured to:
  receive emergency instructional content indicative of being generated and provided by a first user of a wireless network, the emergency instructional content comprising a first emergency attribute,
   wherein the first user of the wireless network is associated with a second user of the wireless network,
   wherein the second user of the wireless network is an operator of a first communications device, and
   wherein the emergency instructional content is intended for presentation on the first communications device;
  receive an emergency alert message comprising a second emergency attribute from an emergency services agency; and
  transmit an emergency instructional message to the first communications device; and
 a processing portion configured to:
  determine that a location of the first communications device corresponds to the emergency instructional content;

determine that the first emergency attribute is the same as the second emergency attribute;

responsive to determining that the first emergency attribute is the same as the second emergency attribute and to determining that the location of the first communications device corresponds to the emergency instructional content, generate the emergency instructional message comprising the emergency instructional content and the emergency alert message, and store the emergency instructional message on at least one of a mobile device or a server configured to interface with a cellular network, wherein the cellular network is configured to transmit the emergency instructional message to the first communications device.

9. The system of claim 8, wherein the emergency instructional content comprises at least one of a text message, an image, a video, an audio message, a multimedia message, or a combination thereof.

10. The system of claim 8, wherein the first user is at least one of a parent or a guardian of the second user.

11. The system of claim 8, wherein the emergency instructional content comprises first content associated with the location and second content associated with a second location.

12. The system of claim 11, wherein the processing portion configured to generate the emergency instructional message comprising the emergency instructional content and the emergency alert message comprises the processing portion configured to select the first content associated with the location based on determining that the location of the first communications device corresponds to the emergency instructional content.

13. The system of claim 8, wherein the emergency services agency comprises an Emergency Alert System.

14. The system of claim 8, wherein the input/output portion configured to receive the emergency instructional content comprises the input/output portion configured to receive an indication of the location.

15. A non-transitory computer-readable storage medium having stored thereon computer-executable instructions that, when executed by a processor, effectuate operations comprising:

receiving emergency instructional content indicative of being generated and provided by a first user of a wireless network, the emergency instructional content comprising a first emergency attribute,
wherein the first user of the wireless network is associated with a second user of the wireless network,
wherein the second user of the wireless network is an operator of a first communications device, and
wherein the emergency instructional content is intended for presentation on the first communications device;

receiving an emergency alert message from an emergency services agency, wherein the emergency alert message comprises a second emergency attribute that corresponds to the first emergency attribute;

determining that a location of the first communications device corresponds to the emergency instructional content;

responsive to receiving the emergency alert message comprising the second emergency attribute that corresponds to the first emergency attribute and to determining that the location of the first communications device corresponds to the emergency instructional content, generating an emergency instructional message comprising the emergency instructional content and the emergency alert message;

storing the emergency instructional message on at least one of a mobile device or a server configured to interface with a cellular network, wherein the cellular network is configured to transmit the emergency instructional message to the first communications device; and transmitting the emergency instructional message to the first communications device.

16. The non-transitory computer-readable storage medium of claim 15, wherein the emergency instructional content comprises at least one of a text message, an image, a video, an audio message, a multimedia message, or a combination thereof.

17. The non-transitory computer-readable storage medium of claim 15, wherein the first user is at least one of a parent or a guardian of the second user.

18. The non-transitory computer-readable storage medium of claim 15, wherein the emergency instructional content comprises first content associated with the location and second content associated with a second location.

19. The non-transitory computer-readable storage medium of claim 18, wherein the operation of generating the emergency instructional message comprising the emergency instructional content and the emergency alert message comprises selecting the first content associated with the location based on determining that the location of the first communications device corresponds to the emergency instructional content.

20. The non-transitory computer-readable storage medium of claim 15, wherein the operation of receiving the emergency instructional content comprises receiving an indication of the location.

\* \* \* \* \*